United States Patent
Tsubouchi et al.

(10) Patent No.: US 10,297,814 B2
(45) Date of Patent: May 21, 2019

(54) LITHIUM ION SECONDARY BATTERY

(71) Applicant: TOYOTA JIDOSHA KABUSHIKI KAISHA, Toyota-shi, Aichi-ken (JP)

(72) Inventors: Hiroshi Tsubouchi, Okazaki (JP); Motoshi Isono, Toyota (JP); Masaki Kato, Toyota (JP); Naoyuki Wada, Hirakata (JP); Keiichi Takahashi, Nishinomiya (JP); Yukihiro Okada, Shijonawate (JP); Tatsuya Hashimoto, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 23 days.

(21) Appl. No.: 15/819,387

(22) Filed: Nov. 21, 2017

(65) Prior Publication Data

US 2018/0159109 A1    Jun. 7, 2018

(30) Foreign Application Priority Data

Dec. 7, 2016   (JP) ................... 2016-237800

(51) Int. Cl.
| | |
|---|---|
| *H01M 2/34* | (2006.01) |
| *H01M 10/0525* | (2010.01) |
| *H01M 10/42* | (2006.01) |
| *H01M 2/12* | (2006.01) |
| *H01M 4/131* | (2010.01) |

(Continued)

(52) U.S. Cl.
CPC ......... *H01M 2/345* (2013.01); *H01M 2/1241* (2013.01); *H01M 4/131* (2013.01); *H01M 4/136* (2013.01); *H01M 4/364* (2013.01); *H01M 4/505* (2013.01); *H01M 4/525* (2013.01); *H01M 4/5825* (2013.01); *H01M 10/0525* (2013.01);

(Continued)

(58) Field of Classification Search
CPC combination set(s) only.
See application file for complete search history.

(56) References Cited

U.S. PATENT DOCUMENTS

| | | | |
|---|---|---|---|
| 2010/0081055 A1* | 4/2010 | Konishi | ................ H01M 4/364 429/223 |
| 2011/0177364 A1* | 7/2011 | Miyazaki | .............. H01M 4/131 429/53 |

FOREIGN PATENT DOCUMENTS

| | | | | |
|---|---|---|---|---|
| JP | 2008-277106 | * | 11/2008 | .......... H01M 10/052 |
| JP | 2008-277106 A | | 11/2008 | |
| JP | 2011-018645 A | | 1/2011 | |

* cited by examiner

*Primary Examiner* — Amanda J Barrow
(74) *Attorney, Agent, or Firm* — Sughrue Mion, PLLC

(57) ABSTRACT

A positive electrode includes first positive electrode active material particles and second positive electrode active material particles. The first positive electrode active material particles include 0.1% by mass or more and 1% by mass or less of lithium carbonate and a first lithium transition metal oxide as a remainder. The first lithium transition metal oxide is represented by $LiM^1_{(1-z1)}Mn_{z1}O_2$ ($0.05 \leq z1 \leq 0.20$). The second positive electrode active material particles include 0.01% by mass or more and 0.05% by mass or less of lithium carbonate and a second lithium transition metal oxide as a remainder. The second lithium transition metal oxide is represented by $LiM^2_{(1-z2)}Mn_{z2}O_2$ ($0.40 \leq z2 \leq 0.60$). An electrolytic solution includes 1% by mass or more and 5% by mass or less of an overcharging additive and a solvent and a lithium salt as a remainder.

5 Claims, 7 Drawing Sheets

(51) Int. Cl.
*H01M 4/136* (2010.01)
*H01M 4/525* (2010.01)
*H01M 4/505* (2010.01)
*H01M 4/58* (2010.01)
*H01M 4/36* (2006.01)

(52) U.S. Cl.
CPC .... *H01M 10/4235* (2013.01); *H01M 2200/20* (2013.01)

LITHIUM ION SECONDARY BATTERY

INCORPORATION BY REFERENCE

The disclosure of Japanese Patent Application No. 2016-237800 filed on Dec. 7, 2016 including the specification, drawings and abstract is incorporated herein by reference in its entirety.

BACKGROUND

1. Technical Field

The disclosure relates to a lithium ion secondary battery.

2. Description of Related Art

Japanese Unexamined Patent Application Publication No. 2008-277106 (JP 2008-277106 A) discloses a lithium ion secondary battery including a pressure-actuated current interrupt device, a positive electrode mixture including lithium carbonate, and an electrolytic solution including biphenyl (hereinafter, in some cases, abbreviated as "battery").

Overcharging is one of the abnormal modes of batteries. For example, when abnormality is caused in the control of a charging apparatus, charging batteries beyond their full charging capacity, that is, overcharging occurs.

Devices that safely bring battery functions to a stop using the generation of gas in batteries during overcharging (hereinafter, referred to as "pressure-actuated safety devices") are proposed. Pressure-actuated safety devices convert pressures attributed to the generation of gas to, for example, mechanical operations such as blocking of circuits. When pressure-actuated safety devices are exposed to high voltages in order to accelerate the operation of the devices during overcharging, overcharging additives generating gases are used.

As overcharging additives that are added to positive electrodes, lithium carbonate ($Li_2CO_3$) is proposed. During overcharging in temperature environments of 60° C. or higher, lithium carbonate actively decomposes and generates a large amount of carbon dioxide ($CO_2$) gas. However, in temperature environments of lower than 60° C., the amount of $CO_2$ gas generated is smaller than usual. This is considered to be because, in temperature environments of lower than 60° C., the decomposition reaction of lithium carbonate is not active.

As overcharging additives that are added to electrolytic solutions, benzene derivatives (for example, biphenyl and the like) having a lower oxidation potential than electrolytic solution solvents (hereinafter, also simply referred to as "solvents") are proposed. During overcharging in temperature environments of lower than 60° C., benzene derivatives cause polymerization reactions in positive electrodes and generate protons ($H^+$). Protons migrate to negative electrodes, and the protons are reduced in the negative electrodes. Therefore, a large amount of hydrogen ($H_2$) gas is generated. However, in temperature environments of 60° C. or higher, the amount of $H_2$ gas generated is smaller than usual. This is considered to be because, in temperature environments of 60° C. or higher, a phenomenon in which benzene derivatives are oxidized and turned into cations, the cations migrate to negative electrodes, reduce the negative electrodes, and then return to positive electrodes (so-called "redox shuttle phenomenon") becomes dominant.

FIG. 1 is a schematic graph illustrating a relationship between the amount of $CO_2$ gas generated by lithium carbonate and the amount of $H_2$ gas generated by benzene derivatives, and temperature. As illustrated in FIG. 1, lithium carbonate and benzene derivatives have mutually different temperature environments in which the amount of gas generated increases on both sides of a temperature near 60° C.

Therefore, in order to accelerate the generation of gas in wide ranges of temperature environments, that is, both temperature environments of lower than 60° C. and temperature environments of 60° C. or higher, the use of a combination of lithium carbonate and benzene derivatives is considered. However, in this case, it is considered that the securement of the amount of gas generated in temperature environments of lower than 60° C. is difficult. That is, lithium carbonate is weakly alkaline. When alkaline components coexist, protons generated by the polymerization reactions of benzene derivatives are trapped by the alkaline components. Therefore, it is considered that protons are not capable of reaching negative electrodes and the amount of $H_2$ gas generated is smaller than usual.

SUMMARY

In order to increase the amount of gas generated, an increase in the amount of each of overcharging additives can also be considered. However, lithium carbonate can be gradually decomposed due to positive electrode potentials even when batteries are ordinarily used as well as are overcharged. Therefore, when the amount of lithium carbonate added is too large, there is a possibility that pressure-actuated safety devices malfunction when batteries are ordinarily used as well as are overcharged. On the other hand, when the amount of benzene derivatives added is too large, coatings are formed on positive electrodes, and there is a possibility that battery resistance increases more than usual.

The disclosure provides a lithium ion secondary battery in which, in wide ranges of temperature environments, the generation of gas is accelerated during overcharging.

Hereinafter, the technical configurations and operation and effects of the aspects of the disclosure will be described. However, the operation mechanisms of the aspects of the disclosure include assumptions. The scope of the aspects of the disclosure is not limited by whether or not the operation mechanisms are correct.

An aspect of the disclosure relates to a lithium ion secondary battery including a chassis, a pressure-actuated safety device configured to operate depending on an internal pressure of the chassis, a positive electrode accommodated in the chassis, a negative electrode accommodated in the chassis, and an electrolytic solution accommodated in the chassis. The positive electrode includes first positive electrode active material particles and second positive electrode active material particles. The first positive electrode active material particles include 0.1% by mass or more and 1% by mass or less of lithium carbonate and a first lithium transition metal oxide as a remainder. The first lithium transition metal oxide is represented by the following first formula.

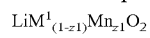

Here, $M^1$ represents a metal element other than Mn, and z1 satisfies $0.05 \le z1 \le 0.20$. The second positive electrode active material particles include 0.01% by mass or more and 0.05% by mass or less of lithium carbonate and a second lithium transition metal oxide as a remainder. The second lithium transition metal oxide is represented by the following second formula.

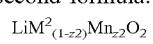

Here, $M^2$ represents a metal element other than Mn, and z2 satisfies $0.40 \le z2 \le 0.60$. The electrolytic solution includes 1% by mass or more and 5% by mass or less of an overcharging additive, and a solvent and a lithium salt as a remainder. The overcharging additive is a benzene derivative having a lower oxidation potential than the solvent.

In the lithium ion secondary battery of the aspect of the disclosure, two kinds of positive electrode active material particles having mutually different compositions are used. The first positive electrode active material particles include lithium carbonate and the first lithium transition metal oxide. The first lithium transition metal oxide is a lithium transition metal oxide having a relatively small content (z1) of manganese (Mn). The first lithium transition metal oxide constitutes particles. Lithium carbonate is attached to the particles constituted of the first lithium transition metal oxide.

The second positive electrode active material particles include lithium carbonate and the second lithium transition metal oxide. The second lithium transition metal oxide is a lithium transition metal oxide having a relatively large content (z2) of Mn. The second lithium transition metal oxide configures particles. Lithium carbonate is attached to the particles configured of the second lithium transition metal oxide.

Based on the relationship (z1<z2) regarding the content of Mn, the second lithium transition metal oxide is considered to react with lithium (Li) ions at a relatively higher potential than the first lithium transition metal oxide. That is, during overcharging, the second lithium transition metal oxide is considered to have a relatively higher potential than the first lithium transition metal oxide.

In the aspect of the disclosure, the second positive electrode active material particles play a role of being a starting point for $H_2$ gas generation reactions. This is because the second lithium transition metal oxide has a potential that easily increases and includes a relatively smaller amount of lithium carbonate that hinders $H_2$ gas generation reactions. Therefore, it is considered that, during overcharging in temperature environments of lower than 60° C., a large amount of $H_2$ gas is generated.

On the other hand, during overcharging in temperature environments of 60° C. or higher, the amount of $H_2$ gas generated is smaller than usual, but the polymerization reaction of the benzene derivative proceeds. The polymerization reaction generates heat of polymerization. Furthermore, the polymerization of the benzene derivative forms a resistance coating on the surfaces of the second positive electrode active material particles. Charging through the resistance coating generates Joule heat. The heat of polymerization and the Joule heat accelerate the decomposition reaction of lithium carbonate. Therefore, it is considered that $CO_2$ gas is efficiently generated in spite of the small amount of lithium carbonate.

In the aspect of the disclosure, the first positive electrode active material particles play a role as a principal reaction field of lithium carbonate. Therefore, the first positive electrode active material particles include a relatively larger amount of lithium carbonate than the second positive electrode active material particles. Therefore, it is considered that, during overcharging in temperature environments of 60° C. or higher, a large amount of $CO_2$ gas is generated.

Furthermore, as described above, the first lithium transition metal oxide has a relatively lower potential than the second lithium transition metal oxide. Therefore, it is considered that the decomposition of lithium carbonate is suppressed when the battery is ordinarily used although the content of lithium carbonate in the first positive electrode active material particles is large. That is, it is considered that the malfunction of the pressure-actuated safety device is suppressed.

In the lithium ion secondary battery of the aspect of the disclosure, it is considered that the generation of gas during overcharging is accelerated in wide ranges of temperature environments.

The content of lithium carbonate in the first positive electrode active material particles is set to 0.1% by mass or more and 1% by mass or less. When the content of lithium carbonate in the first positive electrode active material particles is less than 0.1% by mass, there is a possibility that a sufficient amount of gas generated cannot be secured during overcharging in temperature environments of 60° C. or higher. When the content of lithium carbonate in the first positive electrode active material particles exceeds 1% by mass, there is a possibility that the pressure-actuated safety device malfunctions when the pressure-actuated safety device is ordinarily used (for example, when the pressure-actuated safety device is preserved at high temperatures or the like). Furthermore, in the first lithium transition metal oxide, the content (z1) of Mn is set to satisfy $0.05 \leq z1 \leq 0.20$. This is because, with the content (z1) of Mn in the range described above, the effects described above are verified.

The content of lithium carbonate in the second positive electrode active material particles is set to 0.01% by mass or more and 0.05% by mass or less. When the content of lithium carbonate in the second positive electrode active material particles is less than 0.01% by mass, there is a possibility that a sufficient amount of gas generated cannot be secured during overcharging in temperature environments of 60° C. or higher. When the content of lithium carbonate in the second positive electrode active material particles exceeds 0.05% by mass, there is a possibility that a sufficient amount of gas generated cannot be secured during overcharging in temperature environments of lower than 60° C. Furthermore, in the second lithium transition metal oxide, the content (z2) of Mn is set to satisfy $0.40 \leq z2 \leq 0.60$. This is because, with the content (z2) of Mn in the range described above, the effects are verified.

In the aspect of the disclosure, the overcharging additive refers to a compound that generates gas during overcharging, that is, when the battery is charged beyond the designed highest voltage of the battery. In the aspect of the disclosure, as the overcharging additive that is added to the electrolytic solution, a benzene derivative having a lower oxidation potential than the solvent is used. Therefore, the polymerization reaction and the generation of protons are initiated even before the oxidation decomposition of the solvent is initiated, and thus the rapid operation of the pressure-actuated safety device can be expected.

The oxidation potentials of the solvent and the overcharging additive can be measured through, for example, cyclic voltammetry (CV). Which oxidation potential is greater can also be determined through molecular orbital calculation. That is, as the highest occupied molecular orbital (HOMO) of the compound increases, the oxidation potential is considered to decrease.

The content of the overcharging additive in the electrolytic solution is set to 1% by mass or more and 5% by mass or less. When the content of the overcharging additive is less than 1% by mass, there is a possibility that a sufficient amount of gas generated cannot be secured irrespective of temperature environments. When the content of the overcharging additive exceeds 5% by mass, there is a possibility that battery resistance increases more than usual due to the formation of a coating on the positive electrode.

In the lithium ion secondary battery according to the aspect, the first lithium transition metal oxide may also be represented by the following third formula.

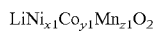

Here, x1, y1, and z1 satisfy $0.40 \leq x1 \leq 0.45$, $0.40 \leq y1 \leq 0.50$, $0.05 \leq z1 \leq 0.20$, and $x1+y1+z1=1$. The second lithium transition metal oxide may also be represented by the following fourth formula.

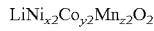

Here, x2, y2, and z2 satisfy $0.20 \leq x2 \leq 0.40$, $0.20 \leq y2 \leq 0.25$, $0.40 \leq z2 \leq 0.60$, and $x2+y2+z2=1$.

The lithium transition metal oxides represented by the two formulae are considered as stable compounds that are relatively easily synthesizable. Therefore, the lithium transition metal oxides represented by the two formulae are considered to be preferable as the first lithium transition metal oxide and the second lithium transition metal oxide in the aspect of the disclosure.

In the lithium ion secondary battery according to the aspect, the benzene derivative may be at least one of cyclohexylbenzene and biphenyl. Cyclohexylbenzene (CHB) and biphenyl (BP) generate a relatively large amount of $H_2$ gas and are thus preferable as the benzene derivative in the aspect of the disclosure.

In the lithium ion secondary battery according to the aspect, the electrolytic solution may include 1% by mass or more and 3% by mass or less of the overcharging additive. In such a case, for example, a decrease in battery resistance can be expected.

In the lithium ion secondary battery according to the aspect, the first positive electrode active material particles and the second positive electrode active material particles may satisfy a relationship of 3:7 to 7:3 (the first positive electrode active material particles:the second positive electrode active material particles) in mass ratio. At mixing ratios in the range described above, there is a tendency that the balance between the output at a low state of charge (SOC) (approximately SOC 0% to SOC 40%) and the output at a middle SOC (approximately SOC 40% to SOC 60%) becomes favorable. SOC represents the percentage of the charging capacity with respect to the full charging capacity of batteries.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the disclosure (hereinafter, referred to as "the embodiment") will be described. However, the following description does not limit the scope of the disclosure.

Lithium Ion Secondary Battery

Figure 1:
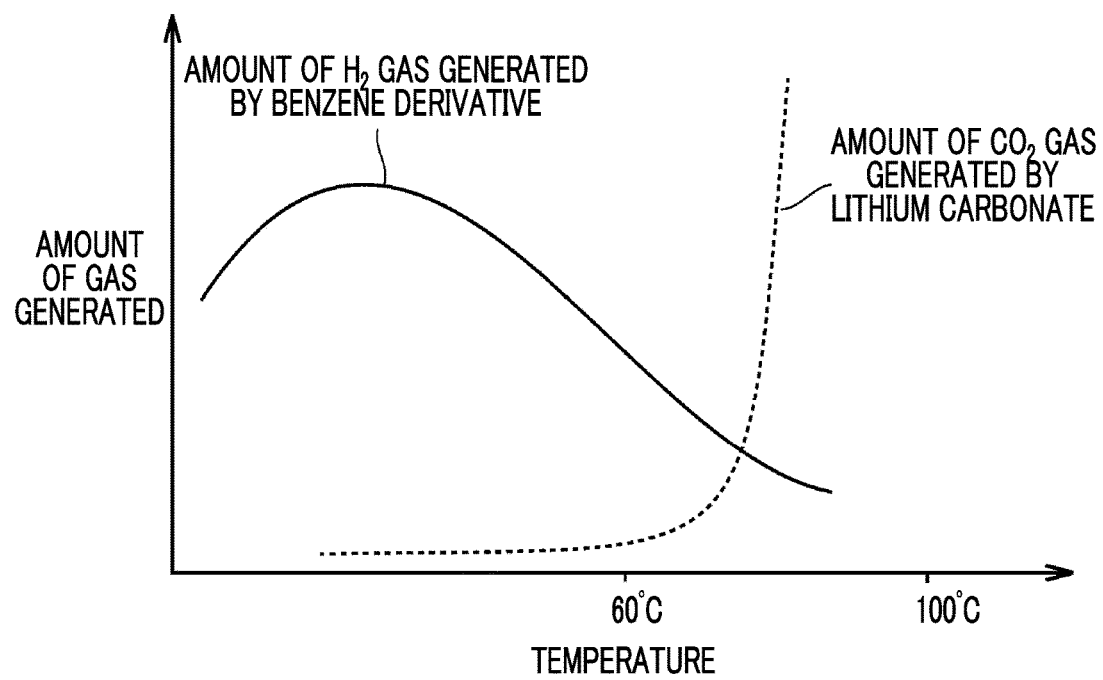
FIG. 1 is a schematic graph illustrating a relationship between the amount of $CO_2$ gas generated by lithium carbonate and the amount of $H_2$ gas generated by a benzene derivative, and temperature.
Figure 2:
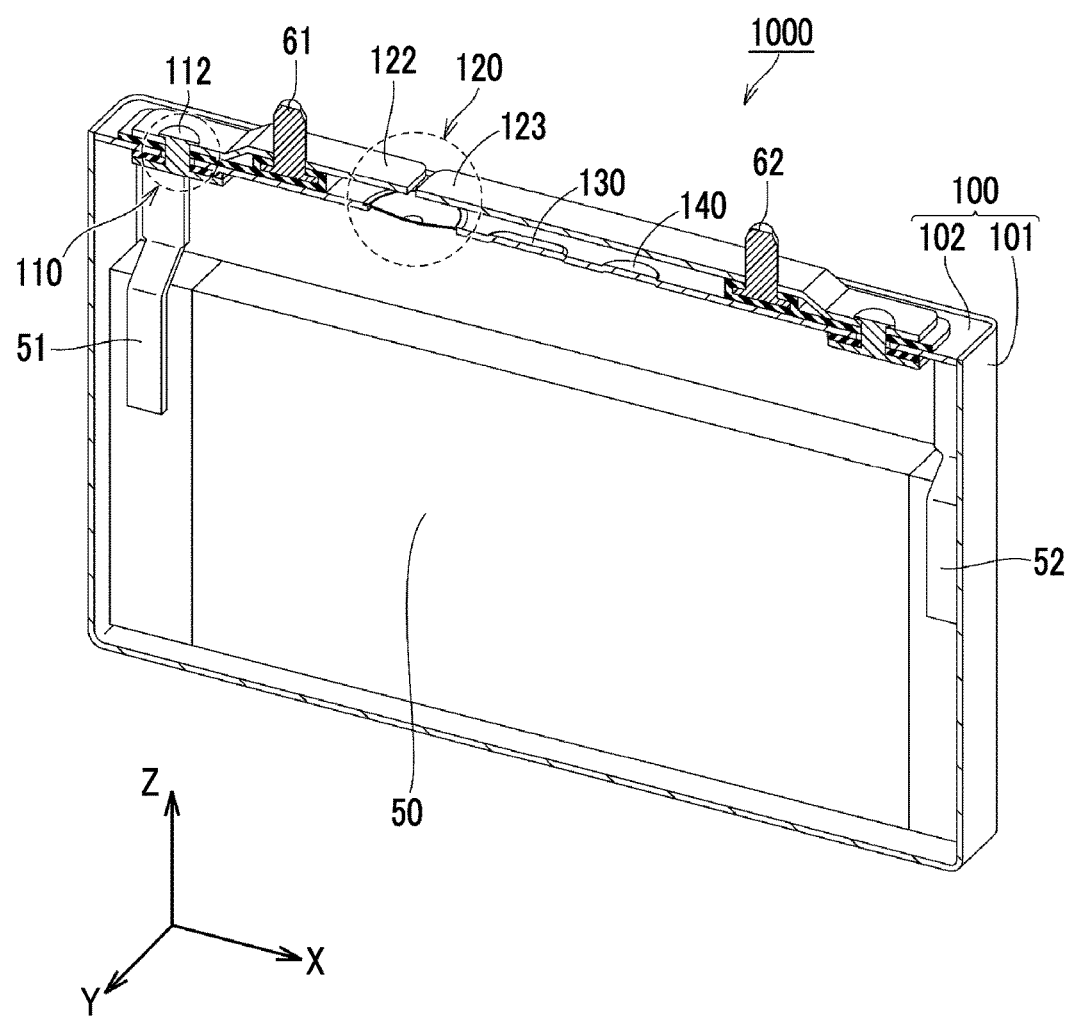
FIG. 2 is a schematic view illustrating an example of a configuration of a lithium ion secondary battery of an embodiment of the disclosure.

FIG. 2 is a schematic view illustrating an example of the configuration of a lithium ion secondary battery of the embodiment. A battery 1000 includes at least a chassis 100. In the chassis 100, an electrode group 50 and an electrolytic solution (not illustrated) are accommodated. The electrode group 50 is electrically connected to a positive electrode collector tab 51 and a negative electrode collector tab 52. The positive electrode collector tab 51 is electrically connected to a positive electrode terminal 61 (external terminal). The negative electrode collector tab 52 is electrically connected to a negative electrode terminal 62 (external terminal). The electrolytic solution includes a holding electrolytic solution and an excess electrolytic solution. The holding electrolytic solution is impregnated into the electrode group 50. The excess electrolytic solution is retained in a bottom portion of the chassis 100.

Chassis

The chassis 100 illustrated in FIG. 2 has a rectangular shape (flat cuboid). However, the chassis in the embodiment may have a cylindrical shape. The chassis 100, typically, can be configured of a metallic material such as aluminum (Al), an Al alloy, or stainless steel. However, the chassis may be configured of, for example, an aluminum-laminated film or the like as long as a predetermined sealing property can be realized. The chassis 100 includes, for example, a main body 101 and a lid 102. The main body 101 and the lid 102 may be welded through, for example, laser welding. The lid 102 is provided with a gas discharge valve 130 and an injection hole 140.

Pressure-Actuated Safety Device

The battery 1000 includes at least a pressure-actuated safety device that operates depending on the internal pressure of the chassis 100. In the embodiment, as an example of the pressure-actuated safety device, a current interrupt device (CID) and an external short-circuit device. However, the pressure-actuated safety device is not limited to the devices described above as long as devices operate depending on the internal pressure of the chassis 100. The battery of the embodiment includes both the current interrupt device and the external short-circuit device, but the battery may include any one of the current interrupt device and the external short-circuit device.

Current Interrupt Device

Figure 3:
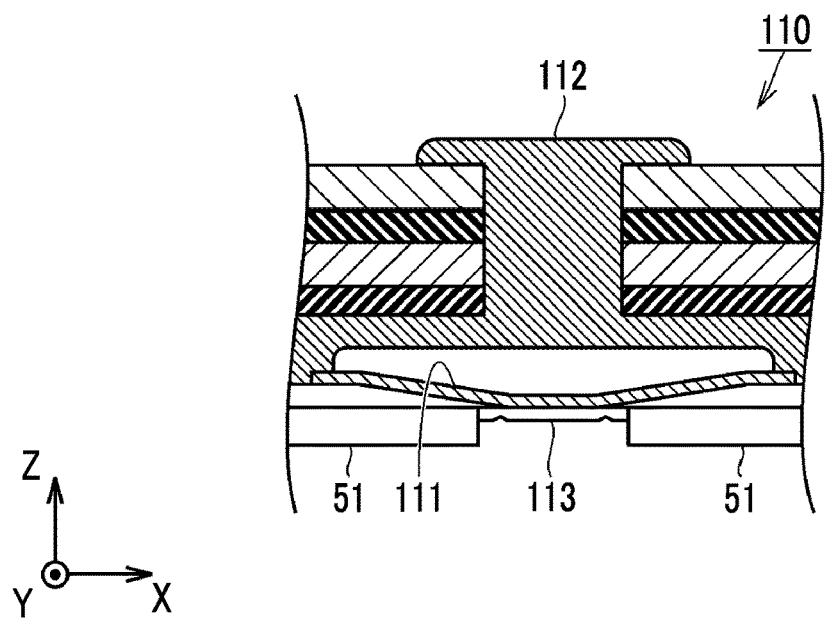
FIG. 3 is a first schematic cross-sectional view illustrating an example of a configuration of a current interrupt device.

As illustrated in FIG. 2, in the middle of a circuit connecting the electrode group 50 and the positive electrode terminal 61, a current interrupt device 110 is provided. FIG. 3 is a first schematic cross-sectional view illustrating an example of the configuration of the current interrupt device.

The current interrupt device 110 is configured of a reflection plate 111, a rivet 112, and a rupture disk 113. The reflection plate 111 has a shape in which the center of the reflection plate 111 protrudes toward the rupture disk 113. The rupture disk 113 is electrically connected to the positive electrode collector tab 51. The rivet 112 is electrically connected to the reflection plate 111. The rivet 112 is also electrically connected to the positive electrode terminal 61 (refer to FIG. 2). During charging, currents sequentially flow through the positive electrode terminal 61, the rivet 112, the reflection plate 111, the rupture disk 113, the positive electrode collector tab 51, and the electrode group 50.

Figure 4:
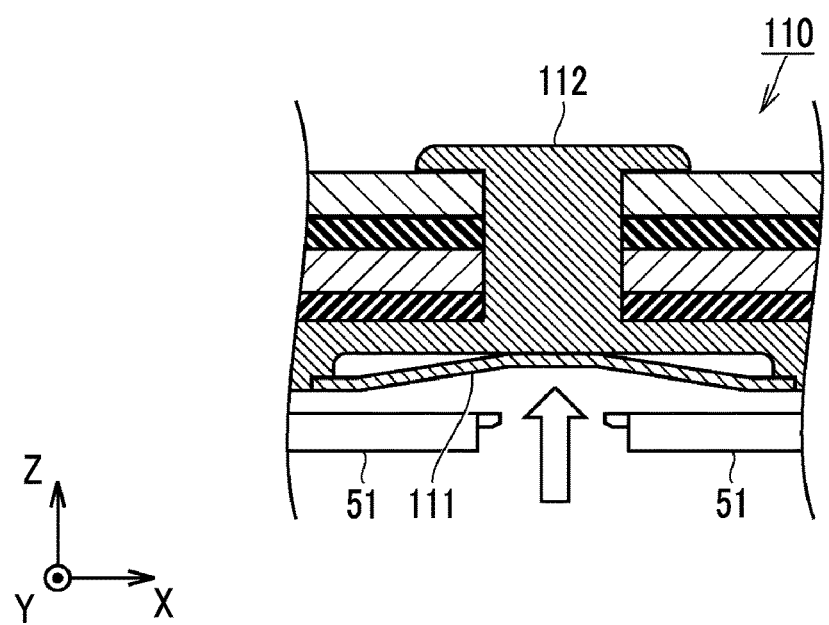
FIG. 4 is a second schematic cross-sectional view illustrating an example of the configuration of the current interrupt device.

FIG. 4 is a second schematic cross-sectional view illustrating an example of the configuration of the current interrupt device. During overcharging, when gas is generated in the chassis 100, and the internal pressure increases, the rupture disk 113 is pressed by the gas. When the internal pressure exceeds a predetermined value (also referred to as "operation pressure"), the rupture disk 113 ruptures. The reflection plate 111 is pressed by the gas and deforms so as to approximate to the rivet 112. Therefore, the circuit between the positive electrode collector tab 51 and the rivet 112 is cut. That is, the circuit connecting the electrode group 50 and the positive electrode terminal 61 is interrupted. The interruption of the circuit forms a state in which additional charging is not possible.

Thus far, an example in which the current interrupt device 110 is provided on a positive electrode terminal 61 side has been described. However, the current interrupt device 110 may be provided on a negative electrode terminal 62 side. The current interrupt device 110 may be provided on both the positive electrode terminal 61 side and the negative electrode terminal 62 side.

External Short-Circuit Device

Figure 5:
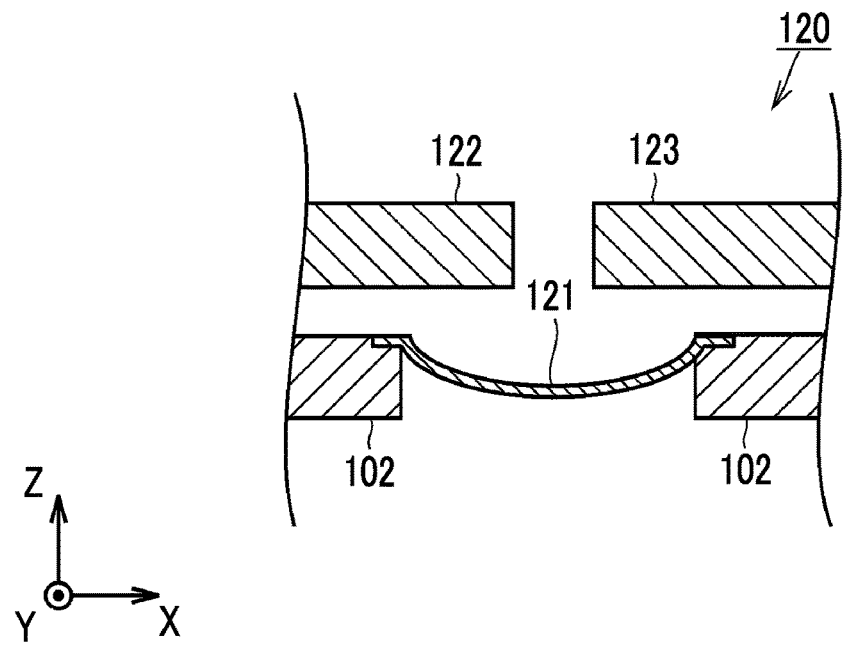
FIG. 5 is a first schematic cross-sectional view illustrating an example of a configuration of an external short-circuit device.

As illustrated in FIG. 2, an external short-circuit device 120 is provided in the chassis 100. FIG. 5 is a first schematic cross-sectional view illustrating an example of the configuration of the external short-circuit device. The external short-circuit device 120 is configured of a reflection plate 121, a positive electrode short-circuit plate 122, and a negative electrode short-circuit plate 123. The reflection plate 121 has a shape in which the center of the reflection plate 121 protrudes toward the inside of the chassis 100. The positive electrode short-circuit plate 122 is electrically connected to the positive electrode terminal 61 (refer to FIG. 2). The negative electrode short-circuit plate 123 is electrically connected to the negative electrode terminal 62. Normally, a gap is present between the positive electrode short-circuit plate 122 and the negative electrode short-circuit plate 123, and currents do not flow between the positive electrode short-circuit plate 122 and the negative electrode short-circuit plate 123.

Figure 6:
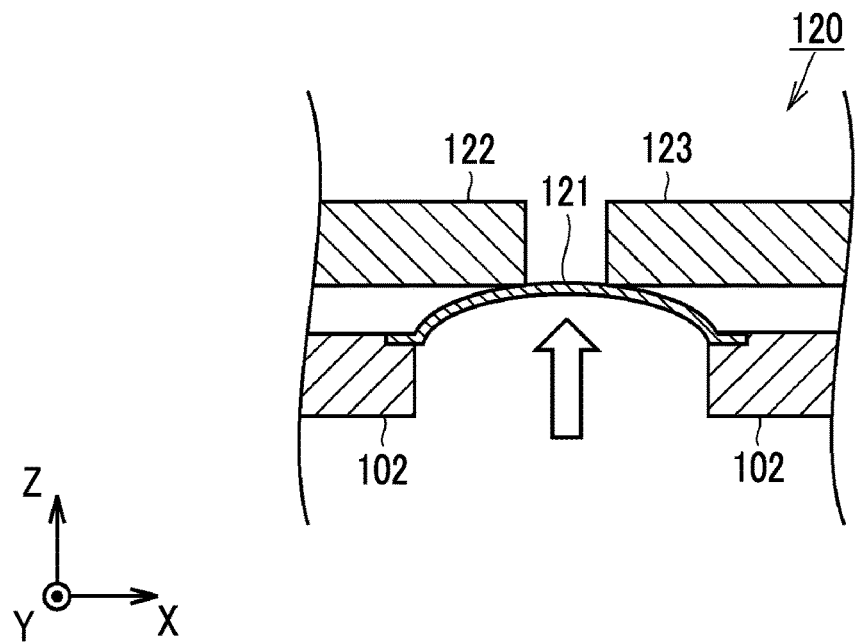
FIG. 6 is a second schematic cross-sectional view illustrating an example of the configuration of the external short-circuit device.

FIG. 6 is a second schematic cross-sectional view illustrating an example of the configuration of the external short-circuit device. During overcharging, when gas is generated in the chassis 100, and the internal pressure increases, the reflection plate 121 is pressed by the gas. When the internal pressure exceeds a predetermined value (the operation pressure), the reflection plate 121 deforms toward the positive electrode short-circuit plate 122 and the negative electrode short-circuit plate 123 and comes into contact with the positive electrode short-circuit plate 122 and the negative electrode short-circuit plate 123. Therefore, the positive electrode short-circuit plate 122 and the negative electrode short-circuit plate 123 are short-circuited through the reflection plate 121, and a short circuit is formed. When current flows through the short circuit, energy charged in the battery 1000 is consumed, and the battery 1000 transits to a safe state. For example, short-circuit currents may be adjusted to an appropriate value using the material, shape, and the like of the reflection plate 121, the positive electrode short-circuit plate 122, and the negative electrode short-circuit plate 123.

Gas Discharge Valve

The gas discharge valve 130 is configured to discharge gas when the internal pressure of the chassis 100 exceeds the predetermined value (operation pressure). In the battery 1000, the operation pressures may be respectively set so that the current interrupt device 110, the external short-circuit device 120, and the gas discharge valve 130 operate in this order.

Electrode Group

Figure 7:
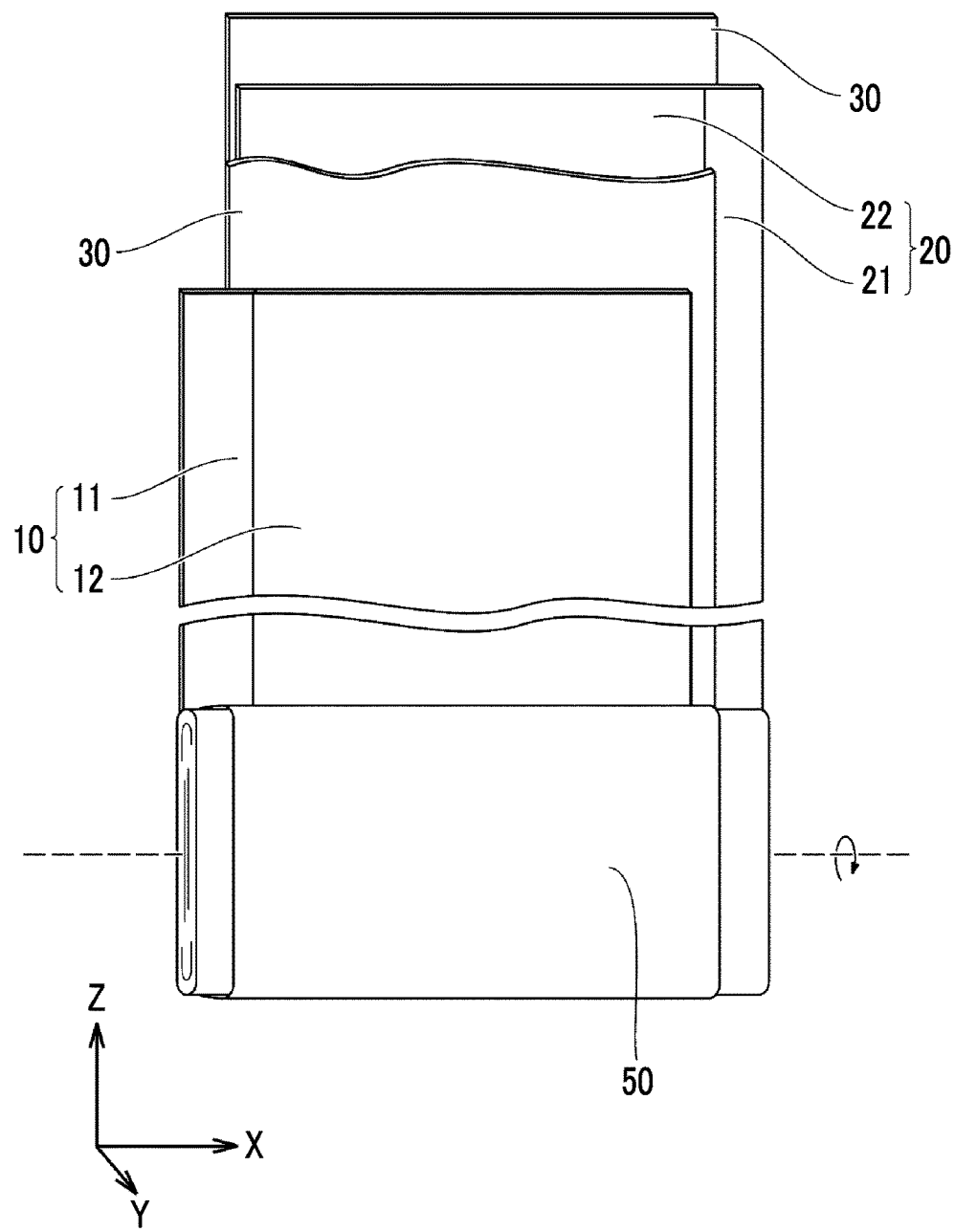
FIG. 7 is a schematic view illustrating an example of a configuration of an electrode group.

FIG. 7 is a schematic view illustrating an example of the configuration of the electrode group. The electrode group 50 includes a positive electrode 10, a negative electrode 20, and a separator 30. The electrolytic solution is impregnated into the electrode group 50. That is, the battery 1000 includes at least the positive electrode 10, the negative electrode 20, and the electrolytic solution that are accommodated in the chassis 100. The positive electrode 10, the negative electrode 20, and the separator 30 are all band-shaped sheets. The separator 30 is disposed between the positive electrode 10 and the negative electrode 20. The electrode group 50 is a winding-type electrode group. That is, the electrode group 50 is configured by laminating the positive electrode 10 and the negative electrode 20 with the separator 30 interposed therebetween and, furthermore, winding the positive electrode 10, the negative electrode 20, and the separator 30 in a spiral shape.

The electrode group may be a laminate-type electrode group. In a laminate-type electrode group (not illustrated), the positive electrode, the negative electrode, and the separator are, for example, rectangular sheets. The laminate-type electrode group can be configured by alternately laminating the positive electrode and the negative electrode with the separator interposed therebetween.

Positive Electrode

Figure 8:
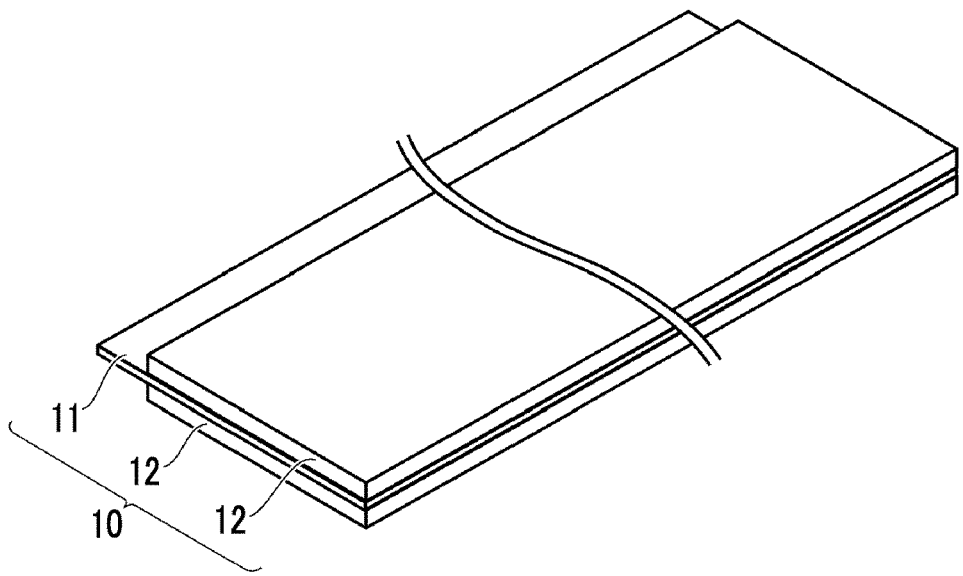
FIG. 8 is a schematic view illustrating an example of a configuration of a positive electrode.

FIG. 8 is a schematic view illustrating an example of the configuration of the positive electrode. The positive electrode 10 is a band-shaped sheet. The positive electrode 10 includes a positive electrode collector 11 and positive electrode mixture layers 12. The positive electrode mixture layers 12 are formed on the surfaces of the positive electrode collector 11. The positive electrode mixture layers 12 are disposed on both surfaces (the front and rear surfaces) of the positive electrode collector 11. At an end of the positive electrode 10 in the width direction (corresponding to the X-axis direction in FIG. 2 and FIG. 7), a part of the positive electrode collector 11 is exposed from the positive electrode mixture layers 12. In the exposed portion, the positive electrode 10 can be electrically connected to the positive electrode collector tab 51.

The positive electrode collector 11 may have a thickness of, for example, 10 μm to 30 μm (typically 12 μm to 20 μm). The positive electrode collector 11 may be, for example, an Al foil. The Al foil may be a pure Al foil or an Al alloy foil.

The positive electrode mixture layer 12 may have a thickness of, for example, 10 μm to 150 μm on both surfaces (typically 50 μm to 100 μm on both surfaces). The positive electrode mixture layer 12 includes first positive electrode active material particles and second positive electrode active material particles. That is, the positive electrode 10 includes first positive electrode active material particles and second positive electrode active material particles. The positive electrode mixture layer 12 may further include a conducting material and a binder in addition to the first positive electrode active material particles and the second positive electrode active material particles. For example, the positive electrode mixture layer 12 may include 1% by mass to 15% by mass of a conducting material, 0.5% by mass to 5% by mass of a binder, and the first positive electrode active material particles and the second positive electrode active material particles as the remainder.

First Positive Electrode Active Material Particles

The first positive electrode active material particles may have an average particle diameter of, for example 1 μm to 30 μm (typically 3 μm to 20 μm). The average particle diameter in the specification refers to the particle diameter at 50% from the small particle side in the volume-based cumulative particle size distribution that is measured using a laser diffraction and scattering method. The first positive electrode active material particles are particles configured of a first lithium transition metal oxide. The first positive electrode active material particles are typically agglomerates of primary particles (secondary particles). Each of the primary particles is configured of the first lithium transition metal oxide. Lithium carbonate is considered to attach to the surfaces of the primary particles, particle boundaries between the primary particles, the surfaces of the secondary particles, and the like.

The first positive electrode active material particles function as a principal reaction field of lithium carbonate. The first positive electrode active material particles include 0.1% by mass or more and 1% by mass or less of lithium carbonate and the first lithium transition metal oxide as the remainder. The lithium carbonate included in the first positive electrode active material particles is considered to generate a large amount of $CO_2$ gas during overcharging in temperature environments of 60° C. or higher.

Content of Lithium Carbonate

Here, for convenience, the first positive electrode active material particles and the second positive electrode active material particles will be collectively referred to as "positive electrode active material particles", and the first lithium transition metal oxide and a second lithium transition metal oxide will be collectively referred to as "lithium transition metal oxides".

The content of lithium carbonate can be adjusted using, for example, the amount of lithium carbonate prepared for the synthesis of the lithium transition metal oxides, the firing temperature, the firing time, and the like. Alternatively, lithium carbonate may be attached to the lithium transition metal oxides using a mechanochemical method or the like. Excess lithium carbonate may be removed by washing the lithium transition metal oxides with water.

The content of lithium carbonate in the positive electrode active material particles in the specification is measured using a method based on JISK 1201-3-2 "Sodium carbonate for industrial use—Part 3: Determination of total soluble alkalinity—Section 2: Potentiometric method". In the measurement, an automatic titration apparatus, a glass electrode, and a comparative electrode (for example, a comparative electrode manufactured by Hiranuma Sangyo Co., Ltd.) can be used.

A measurement subject solution (a substance to be titrated) can be prepared, for example, as described below. Two grams of the positive electrode active material particles are injected into 100 ml of pure water. The pure water is well stirred for 10 minutes. Therefore, a dispersion solution is prepared. The dispersion solution is filtered. The filtrate is collected. The filtrate is used as the measurement subject solution. As a titrant, for example, 1 mol/l of a hydrochloric acid reference solution can be used.

Figure 10:
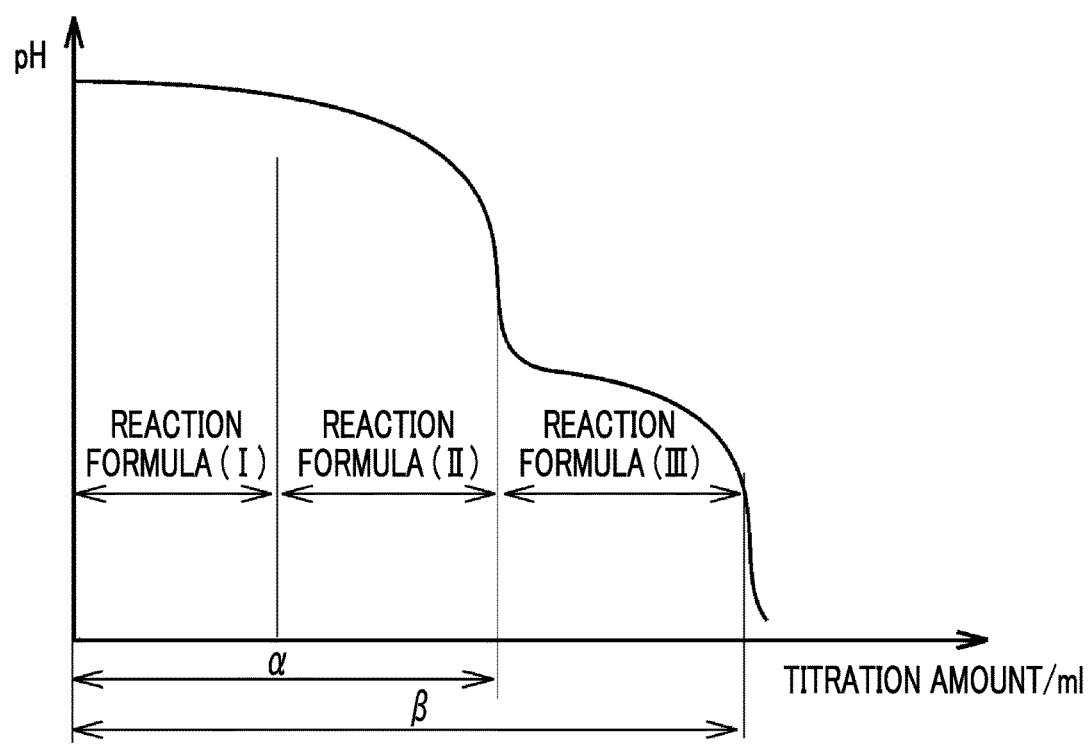
FIG. 10 is a graph schematically illustrating a titration curve.

FIG. 10 is a graph schematically illustrating a titration curve. When the positive electrode active material particles also include lithium hydroxide (LiOH), it is considered that reactions of Reaction Formulae (I) to (III) proceed during titration.

$$LiOH + HCl \rightarrow LiCl + H_2O \quad (I)$$

$$Li_2CO_3 + HCl \rightarrow LiCl + LiHCO_3 \quad (II)$$

$$LiHCO_3 + HCl \rightarrow LiCl + CO_2 + H_2 \quad (III)$$

As illustrated in FIG. 10, the titration curve has two neutralization points. Until the first neutralization point, the reactions of Formulae (I) and (II) are considered to be completed. At the second neutralization point, the reaction of Formula (III) is considered to be completed. Therefore, the titration amount (the amount of HCl) needed for the titration of lithium carbonate ($Li_2CO_3$) is "β−α" in FIG. 10. The amount (g) of lithium carbonate per gram of the positive electrode active material particles is computed from the titration amount. The content (% by mass) of the lithium carbonate in the positive electrode active material particles is computed by multiplying the amount (g) of lithium carbonate by 100.

First Lithium Transition Metal Oxide

The first positive electrode active material particles include the first lithium transition metal oxide as the remainder except for lithium carbonate (99% by mass or more and 99.9% by mass or less). The remainder substantially includes the first lithium transition metal oxide alone. However, the remainder may include impurities that inevitably intrude during manufacturing (hereinafter, referred to as "inevitable impurities"). Examples of the inevitable impurities that can be considered include lithium hydroxide described above, carbon (C), and sulfur (S). The content of lithium hydroxide can be computed from the titration amount (2α−β) in FIG. 10. The content of C can be measured using, for example, a method based on JISG 1211-3 "Iron and Steel—Determination of Carbon Content—Part 3: Infrared Absorption Method After Combustion". The content of S can be measured using, for example, a method based on JISG 1215-4 "Iron and Steel—Determination of Sulfur Content—Part 4: Infrared Absorption Method After Combustion in an Induction Furnace". The content of the inevitable impurities is desirably, for example, 1% by mass or less.

The first lithium transition metal oxide is a lithium transition metal oxide including a relatively small content of Mn. During charging and discharging, the first lithium transition metal oxide is considered to have a lower potential than the second lithium transition metal oxide described below. Therefore, it is considered that, even when the first positive electrode active material particles include a relatively large amount of lithium carbonate, the decomposition of lithium carbonate during ordinary use (for example, when preserved at high temperature or the like) is suppressed. Therefore, it is considered that the malfunction of the pressure-actuated safety device is suppressed.

The composition of the first lithium transition metal oxide is measured through inductively coupled plasma atomic emission spectroscopy (ICP-AES) (which shall also apply to the second lithium transition metal oxide described below).

The first lithium transition metal oxide is represented by Formula (1-1): $LiM^1_{(1-z1)}Mn_{z1}O_2$ (1-1) (in the formula, $M^1$ is a metal element other than Mn, and z1 satisfies $0.05 \leq z1 \leq 0.20$).

The content of Mn (z1) may satisfy $0.05 \leq z1 \leq 0.10$ or may satisfy $0.10 \leq z1 \leq 0.20$. $M^1$ may be, for example, cobalt (Co), nickel (Ni), chrome (Cr), vanadium (V), iron (Fe), aluminum (Al), or the like. $M^1$ may be configured of one kind of metal element or may be configured of two or more kinds of metal elements. For example, $M^1$ may be configured of Ni and Co.

That is, the first lithium transition metal oxide may also be represented by Formula (2-1): $LiNi_{x1}Co_{y1}Mn_{z1}O_2$ (2-1) (in the formula, x1, y1, and z1 satisfy $0.40 \leq x1 \leq 0.45$, $0.40 \leq y1 \leq 0.50$, $0.05 \leq z1 \leq 0.20$, and $x1+y1+z1=1$ is satisfied).

The first lithium transition metal oxide represented by the formula described above is considered as a stable compound that is relatively easily synthesizable. A small amount of the element may be doped into the first lithium transition metal oxide of the formula described above.

That is, the first lithium transition metal oxide may also be represented by Formula (3-1): $Li(Ni_{x1}Co_{y1}Mn_{z1})_{(1-a1)}Al^1{}_aO_2$ (3-1) (in the formula, x1, y1, z1, and a1 satisfy $0.40 \leq x1 \leq 0.45$, $0.40 \leq y1 \leq 0.50$, $0.05 \leq z1 \leq 0.20$, $0.005 \leq a1 \leq 0.01$, and $x1+y1+z1=1$, and $A^1$ may be at least one element selected from the group of magnesium (Mg), aluminum (Al), silicon (Si), calcium (Ca), titanium (Ti), zinc (Zn), gallium (Ga), yttrium (Y), zirconium (Zr), niobium (Nb), molybdenum (Mo), hafnium (Hf), tungsten (W), cerium (Ce), samarium (Sm), europium (Eu), and ytterbium (Yb)).

When a small amount of the element ($A^1$) is doped into the first lithium transition metal oxide, there is a possibility that, for example, high-temperature preservation characteristics and the like improve.

Second Positive Electrode Active Material Particles

The second positive electrode active material particles may have an average particle diameter of, for example 1 μm to 30 μm (typically 3 μm to 20 μm). The second positive electrode active material particles are particles configured of the second lithium transition metal oxide. The second positive electrode active material particles are typically agglomerates of primary particles (secondary particles). Each of the primary particles is configured of the second lithium transition metal oxide. Lithium carbonate is considered to attach to the surfaces of the primary particles, particle boundaries between the primary particles, the surfaces of the secondary particles, and the like.

The second positive electrode active material particles include 0.01% by mass or more and 0.05% by mass or less of lithium carbonate. When the amount of lithium carbonate is small as described above, it is considered that $H_2$ gas generation reactions are not hindered and a large amount of $H_2$ gas is generated during overcharging in temperature environments of lower than 60° C.

Second Lithium Transition Metal Oxide

The second positive electrode active material particles include the second lithium transition metal oxide as the remainder except for lithium carbonate (99.95% by mass or more and 99.99% by mass or less). The remainder substantially includes the second lithium transition metal oxide alone. Similar to the first positive electrode active material particles, the remainder may include inevitable impurities such as lithium hydroxide, C, and S.

The second lithium transition metal oxide is a lithium transition metal oxide including a relatively large content of Mn. It is considered that, during overcharging, the potential of the second lithium transition metal oxide easily increases, and thus the polymerization reaction of the benzene derivative is accelerated.

The second lithium transition metal oxide is represented by Formula (1-2): $LiM^2{}_{(1-z2)}Mn_{z2}O_2$ (1-2) (in the formula, $M^2$ is a metal element other than Mn, and z2 satisfies $0.40 \leq z2 \leq 0.60$).

The content of Mn (z2) may satisfy $0.40 \leq z2 \leq 0.50$ or may satisfy $0.50 \leq z2 \leq 0.60$. $M^2$ may be, for example, Co, Ni, Cr, V, Fe, Al, or the like. $M^2$ may be configured of one kind of metal element or may be configured of two or more kinds of metal elements. For example, $M^2$ may be configured of Ni and Co.

That is, the second lithium transition metal oxide may also be represented by Formula (2-2): $LiNi_{x2}Co_{y2}Mn_{z2}O_2$ (2-2) (in the formula, x2, y2, and z2 satisfy $0.20 \leq x2 \leq 0.40$, $0.20 \leq y2 \leq 0.25$, $0.40 \leq z2 \leq 0.60$, and $x2+y2+z2=1$ is satisfied).

The second lithium transition metal oxide represented by the formula described above is considered as a stable compound that is relatively easily synthesizable. A small amount of the element may be doped into the second lithium transition metal oxide of the formula described above.

That is, the second lithium transition metal oxide may also be represented by Formula (3-2): $Li(Ni_{x2}Co_{y2}Mn_{z2})_{(1-a2)}A^2{}_{a2}O_2$ (3-2) (in the formula, x2, y2, z2, and a2 satisfy $0.20 \leq x2 \leq 0.40$, $0.20 \leq y2 \leq 0.25$, $0.40 \leq z2 \leq 0.60$, $0.005 \leq a2 \leq 0.01$, and $x2+y2+z2=1$ and $A^2$ is at least one element selected from the group of Mg, Al, Si, Ca, Ti, Zn, Ga, Y, Zr, Nb, Mo, Hf, W, Ce, Sm, Eu, and Yb).

When a small amount of the element ($A^2$) is doped into the second lithium transition metal oxide, there is a possibility that, for example, high-temperature preservation characteristics and the like improve.

Mixing Ratios

The first positive electrode active material particles and the second positive electrode active material particles may satisfy a relationship of, for example, 3:7 to 7:3 (the first positive electrode active material particles:the second positive electrode active material particles) in mass ratio. At mixing ratios in the range described above, there is a tendency that the balance between the output at a low SOC and the output at a middle SOC becomes favorable. The first positive electrode active material particles and the second positive electrode active material particles may satisfy a relationship of 4:6 to 6:4 (the first positive electrode active material particles:the second positive electrode active material particles) in mass ratio, may satisfy a relationship of 4:6 to 5:5 (the first positive electrode active material particles: the second positive electrode active material particles), and may satisfy a relationship of 5:5 to 6:4 (the first positive electrode active material particles:the second positive electrode active material particles).

Conducting Material

The conducting material is not particularly limited. The conducting material may be, for example, acetylene black (AB), thermal black, furnace black, vapor-grown carbon fiber (VGCF), graphite, or the like. One kind of a conducting material may be used singly or two or more kinds of conducting materials may be used in combination.

Binder

The binder is also not particularly limited. The binder may be, for example, polyvinylidene fluoride (PVdF), polytetrafluoroethylene (PTFE), polyacrylic acid (PAA), carboxymethyl cellulose (CMC), or the like. One kind of a binder may be used singly or two or more kinds of binders may be used in combination.

Negative Electrode

Figure 9:
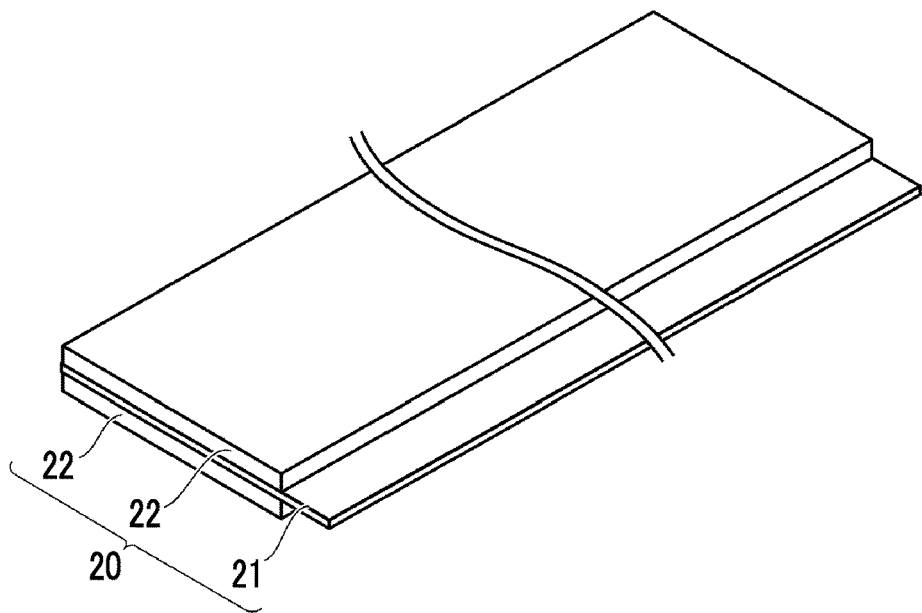
FIG. 9 is a schematic view illustrating an example of a configuration of a negative electrode.

FIG. 9 is a schematic view illustrating an example of the configuration of the negative electrode. The negative electrode 20 is a band-shaped sheet. The negative electrode 20 includes a negative electrode collector 21 and negative electrode mixture layers 22. The negative electrode mixture layers 22 are formed on the surfaces of the negative electrode collector 21. The negative electrode mixture layers 22 are disposed on both surfaces (the front and rear surfaces) of the negative electrode collector 21. At an end of the negative electrode 20 in the width direction (corresponding to the X-axis direction in FIG. 2 and FIG. 7), a part of the negative electrode collector 21 is exposed from the negative electrode mixture layers 22. In the exposed portion, the negative electrode 20 can be electrically connected to the negative electrode collector tab 52.

The negative electrode collector 21 may have a thickness of, for example, 5 μm to 30 μm (typically 6 μm to 15 μm). The negative electrode collector 21 may be, for example, a copper (Cu) foil. The Cu foil may be a pure Cu foil or a Cu alloy foil.

The negative electrode mixture layer 22 may have a thickness of, for example, 10 μm to 150 μm on both surfaces (typically 50 μm to 100 μm on both surfaces). The negative electrode mixture layer 22 includes negative electrode active material particles and a binder. For example, the negative electrode mixture layer 22 may include 0.5% by mass to 5% by mass of a binder and negative electrode active material particles as the remainder.

The negative electrode active material particles are not particularly limited. The negative electrode active material particles may be, for example, graphite, easily graphitizable carbon, hardly graphitizable carbon, silicon, silicon oxide, tin, tin oxide, or the like. The binder is also not particularly limited. The binder may be, for example, CMC, styrene butadiene rubber (SBR), or the like.

Electrolytic Solution

The electrolytic solution includes 1% by mass or more and 5% by mass or less of an overcharging additive, and a solvent and a lithium salt as the remainder. The overcharging additive may be in a state of being dissolved in the solvent or dispersed in the solvent.

Overcharging Additive

The overcharging additive in the embodiment is a benzene derivative having a lower oxidation potential than the solvent. The solvent described below generally has an oxidation potential of higher than 5.0 V (vs. Li/Li$^+$). Therefore, it is considered that the benzene derivative may have an oxidation potential of, for example, 5.0 V or lower (vs. Li/Li$^+$) and may have an oxidation potential of 4.9 V or lower (vs. Li/Li$^+$). Here, "vs. Li/Li$^+$" indicates that the potential is a potential when the equilibrium potential between Li metal and Li ion is set to 0 V (lithium reference potential).

The overcharging additive is desirably not oxidized during ordinary use and oxidized during overcharging. For example, when the full charging voltage of the battery is 4.2 V and the negative electrode active material particles are graphite, the positive electrode potential during full charging is considered to reach approximately 4.3 V (vs. Li/Li$^+$). Therefore, it is considered that the benzene derivative may have an oxidation potential of, for example, higher than 4.3 V (vs. Li/Li$^+$), may have an oxidation potential of 4.4 V or higher (vs. Li/Li$^+$), and may have an oxidation potential of 4.5 V or higher (vs. Li/Li$^+$). As described above, the oxidation potential can be measured through CV.

The benzene derivative is a compound including at least a benzene ring. The benzene derivative is considered to cause polymerization reactions during overcharging and discharge protons. It is considered that protons are reduced in the negative electrode 20 and thus H$_2$ gas is generated.

The benzene derivative may be at least one of CHB and BP. CHB has an oxidation potential of 4.6 V (vs. Li/Li$^+$). BP has an oxidation potential of 4.5 V (vs. Li/Li$^+$). CHB and BP generate a relatively large amount of H$_2$ gas and are thus preferable as the benzene derivative in the embodiment.

Examples of benzene derivatives that can be used in addition to CHB and BP include halides such as fluorobenzene and chlorobenzene; alkylbenzene derivatives such as isopropylbenzene (4.6 V), n-butylbenzene, sec-butylbenzene (4.6 V), tert-butylbenzene (4.9 V), 1,3,5-tri-tert-butylbenzene (5.0 V) and n-octylbenzene; xylene derivatives such as xylene and 5-tert-butyl-m-xylene (4.6 V); toluene derivatives such as toluene, 4-tert-butyltoluene (4.7 V), 3,5-di-tert-butyltoluene (4.8 V); compounds having two or more benzene rings such as p-terphenyl, o-terphenyl, m-terphenyl, and diphenyl ether; and polycyclic aromatic hydrocarbons such as fluorene and coronene. Here, the potentials in the parentheses are lithium-based oxidation potentials. Some hydrogen atoms in the compounds may be substituted with halogen elements (for example, fluorine (F), chlorine (Cl), bromine (Br), and iodine (I)). One kind of a benzene derivative may be used singly or two or more kinds of benzene derivatives may be used in combination.

The content of the overcharging additive is set to 1% by mass or more and 5% by mass or less. When the content of the overcharging additive is less than 1% by mass, there is a possibility that a sufficient amount of gas generated cannot be secured irrespective of temperature environments. When the content of the overcharging additive exceeds 5% by mass, there is a possibility that a coating is formed on the positive electrode and thus the battery resistance increases more than usual. The content of the overcharging additive is preferably 1% by mass or more and 3% by mass or less. In such a case, for example, a decrease in the battery resistance can be expected. The content of the overcharging additive can be measured through gas chromatography mass spectrometry (GC-MS). When two or more kinds of overcharging additives are used, the total content of the overcharging additives is set to 1% by mass or more and 5% by mass or less.

Solvent

The solvent is not protonic. The solvent includes, for example, cyclic carbonate and chain-shaped carbonate. The mixing ratio between the cyclic carbonate and the chain-shaped carbonate may be, for example, 1:9 to 5:5 (the cyclic carbonate:the chain-shaped carbonate) in volume ratio.

Examples of the cyclic carbonate include ethylene carbonate (EC), propylene carbonate (PC), butylene carbonate (BC), and fluoroethylene carbonate (FEC). One kind of cyclic carbonate may be used singly or two or more kinds of cyclic carbonate may be used in combination. Examples of the chain-shaped carbonate include dimethyl carbonate (DMC), ethyl methyl carbonate (EMC), and diethyl carbonate (DEC). One kind of chain-shaped carbonate may be used singly or two or more kinds of chain-shaped carbonate may be used in combination.

The solvent may also include, for example, lactone, cyclic ethers, chain-shaped ethers, carboxylic acid esters, and the like. Examples of lactone include γ-butyrolactone (GBL) and δ-valerolactone. Examples of the cyclic ethers include tetrahydrofuran (THF), 1,3-dioxolane, and 1,4-dioxane. Examples of the chain-shaped ethers include 1,2-dimethoxyethane (DME). Examples of the carboxylic acid esters include methyl formate (MF), methyl acetate (MA), and methyl propionate (MP).

Lithium Salt

The lithium salt functions as a supporting electrolyte. The lithium salt is in a state of being dissolved in the solvent. The electrolytic solution may include, for example, 0.5 to 2.0 mol/l of the lithium salt. Examples of the lithium salt include $LiPF_6$, $LiBF_4$, $Li[N(FSO_2)_2]$, and $Li[N(CF_3SO_2)_2]$. One kind of a lithium salt may be used singly or two or more kinds of lithium salts may be used in combination.

Other Components

The remainder except for the overcharging additive may further include components other than the solvent and the lithium salt. Examples of the other components include additives such as a coating-forming agent. Examples of the coating-forming agent include vinylene carbonate (VC), vinyl ethylene carbonate (VEC), $Li[B(C_2O_4)_2]$ (generally referred to as "LiBOB"), $LiPO_2F_2$, propane sultone (PS), and ethylene sulfite (ES). The electrolytic solution may include, for example, 0.1% by mass to 5% by mass of other components.

Separator

The battery 1000 includes the separator 30. That is, the battery of the embodiment may further include a separator. The separator 30 is an electrically insulating porous film. The separator 30 is electrically isolated from the positive electrode 10 and the negative electrode 20. The separator 30 may have a thickness of, for example, 5 μm to 30 μm.

The separator 30 can be configured of, for example, a porous polyethylene (PE) film or a porous polypropylene (PP) film. The separator 30 may also have a multilayered structure. For example, the separator 30 may be configured by, for example, laminating a porous PP film, a porous PE film, and a porous PP film in this order. The separator 30 may include a heat-resistant layer on the surface of the separator 30. The heat-resistant layer includes a heat-resistant material. Examples of the heat-resistant material include inorganic fillers such as alumina and high-melting-point resins such as polyimides.

Hereinafter, examples will be described. However, the following examples do not limit the scope of the disclosure.

Manufacturing of Lithium Ion Secondary Batteries

A variety of batteries were manufactured as described below.

EXAMPLE 1

The following materials were prepared.
First positive electrode active material particles
First lithium transition metal oxide: $LiNi_{0.4}Co_{0.5}Mn_{0.1}O_2$
Lithium carbonate: 0.4% by mass
Second positive electrode active material particles
Second lithium transition metal oxide: $LiNi_{0.4}Co_{0.2}Mn_{0.4}O_2$
Lithium carbonate: 0.03% by mass
Conducting material: AB
Binder: PVdF
Solvent: N-methyl-2-pyrrolidone (NMP)
Positive electrode collector: Al foil The compositions of the lithium transition metal oxides and the contents of the lithium carbonate are values measured using the methods described above.

A total of 93 parts by mass of the first positive electrode active material particles and the second positive electrode active material particles, 4 parts by mass of the conducting material, 3 parts by mass of the binder, and a predetermined amount of the solvent were mixed together, thereby preparing a positive electrode slurry. The mixing ratio between the first positive electrode active material particles and the second positive electrode active material particles was set to 4:6 (the first positive electrode active material particles:the second positive electrode active material particles) in mass ratio. The positive electrode slurry was applied and dried on the surfaces of the positive electrode collector (both surfaces of the front surface and the rear surface), thereby forming positive electrode mixture layers. The positive electrode mixture layers were rolled to a predetermined thickness. The positive electrode collector and the positive electrode mixture layers were collectively cut to a band shape. Therefore, a positive electrode was manufactured.

The following materials were prepared.
Negative electrode active material particles: Graphite
Binder: CMC and SBR
Solvent: Water
Negative electrode collector: Cu foil Ninety-nine parts by mass of the negative electrode active material particles, 1 part by mass of the binder (0.5 parts by mass of CMC and 0.5 parts by mass of SBR), and a predetermined amount of the solvent were mixed together, thereby preparing a negative electrode slurry. The negative electrode slurry was applied and dried on the surfaces of the negative electrode collector (both surfaces of the front surface and the rear surface), thereby forming negative electrode mixture layers. The negative electrode mixture layers were rolled to a predetermined thickness. The negative electrode collector and the negative electrode mixture layers were collectively cut to a band shape. Therefore, a negative electrode was manufactured.

A band-shaped separator was prepared. The separator was configured by laminating a porous PP film, a porous PE film, and a porous PP film in this order. The positive electrode and the negative electrode were laminated with the separator interposed therebetween, and furthermore, the positive electrode, the separator, and the negative electrode were wound in a spiral shape, thereby constituting an electrode group. The electrode group was formed in a flat shape.

A positive electrode collector tab and a negative electrode collector tab were respectively attached to the electrode group. A chassis including a current interrupt device (CID) as a pressure-actuated safety device was prepared. The CID was configured to operate when the internal pressure of the chassis exceeds 0.7 MPa. The positive electrode collector tab was electrically connected to the positive electrode terminal. The negative electrode collector tab was electrically connected to the negative electrode terminal. The electrode group was accommodated in the chassis.

An electrolytic solution including the following components was prepared.
Solvent: [EC:DMC:EMC=3:4:3 (volume ratio)]
Li salt: $LiPF_6$ (1.1 mol/l)
Overcharging additive (benzene derivative): CHB (3% by mass)

A predetermined amount of the electrolytic solution was injected into the chassis. The chassis was sealed. Therefore, a lithium ion secondary battery was manufactured. The battery was designed to have a capacity of 35 Ah in a voltage range of 3.0 to 4.1 V.

EXAMPLES 2 TO 17 AND COMPARATIVE EXAMPLES 1 TO 5

Batteries were manufactured using the same method as in Example 1 except that a variety of conditions were changed as shown in Table 1.

Evaluations

The batteries were evaluated as described below.

Battery Resistance

The battery was charged to 3.7 V in an environment of 25° C. The battery was discharged at a current of 35 A for 10 seconds. The amount of voltage drop after the 10-second discharging was measured. The amount of voltage drop was divided by the current, thereby computing the battery resistance. The results are shown in the column "battery resistance" in Table 1.

Overcharging Test in Environment of 25° C.

In an environment of 25° C., the battery was fully charged. Furthermore, in the same environment, the battery was charged at a current of 35 A for 45 minutes. During the charging, whether or not the CID operated was confirmed. The results are shown in the column "25° C." in Table 1. In Table 1, Positive (P) indicates that the CID operated. Negative (N) indicates that the CID did not operate.

Overcharging Test in Environment of 60° C.

In an environment of 25° C., the battery was fully charged. Furthermore, in an environment of 60° C., the battery was charged at a current of 35 A for 36 minutes. During the charging, whether or not the CID operated was confirmed. After 36 minutes, the surface temperature of the battery was measured. The results are shown in the column "60° C." in Table 1.

Preservation Test

In an environment of 25° C., the battery was fully charged. The battery was left to stand for two months in an environment of 60° C. During the preservation, whether or not the CID operated was confirmed. The results are shown in the column "60° C. for two months" in Table 1.

TABLE 1

| | Positive electrode | | | | | | | | | | |
|---|---|---|---|---|---|---|---|---|---|---|---|
| | First positive electrode active material particles (A) | | | | Second positive electrode active material particles (B) | | | | Mixing ratio | Electrolytic solution Overcharging additive | |
| | First lithium transition metal oxide $LiMe^1_{(1-z1)}Mn_{z1}O_2$ | | | | Second lithium transition metal oxide $LiMe^2_{(1-z2)}Mn_{z2}O_2$ | | | | | | |
| | $LiNi_{x1}Co_{y1}Mn_{z1}O_2$ | | | $Li_2CO_3$ | $LiNi_{x2}Co_{y2}Mn_{z2}O_2$ | | | $Li_2CO_3$ | A:B | Kind | Content |
| | x1 | y1 | z1 | % by mass | X2 | y2 | z2 | % by mass | — | — | % by mass |
| Example 1 | 0.40 | 0.50 | 0.10 | 0.4 | 0.40 | 0.20 | 0.40 | 0.03 | 4:6 | CHB | 3 |
| Example 2 | 0.40 | 0.50 | 0.10 | 0.1 | 0.40 | 0.20 | 0.40 | 0.03 | 4:6 | CHB | 3 |
| Example 3 | 0.40 | 0.50 | 0.10 | 1.0 | 0.40 | 0.20 | 0.40 | 0.03 | 4:6 | CHB | 3 |
| Example 4 | 0.40 | 0.50 | 0.10 | 0.4 | 0.40 | 0.20 | 0.40 | 0.01 | 4:6 | CHB | 3 |
| Example 5 | 0.40 | 0.50 | 0.10 | 0.4 | 0.40 | 0.20 | 0.40 | 0.05 | 4:6 | CHB | 3 |
| Example 6 | 0.40 | 0.50 | 0.10 | 0.4 | 0.40 | 0.20 | 0.40 | 0.03 | 4:6 | CHB | 1 |
| Example 7 | 0.40 | 0.50 | 0.10 | 0.4 | 0.40 | 0.20 | 0.40 | 0.03 | 4:6 | CHB | 5 |
| Example 8 | 0.45 | 0.50 | 0.05 | 0.4 | 0.40 | 0.20 | 0.40 | 0.03 | 4:6 | CHB | 3 |
| Example 9 | 0.40 | 0.40 | 0.20 | 0.4 | 0.40 | 0.20 | 0.40 | 0.03 | 4:6 | CHB | 3 |
| Example 10 | 0.40 | 0.50 | 0.10 | 0.4 | 0.25 | 0.25 | 0.50 | 0.03 | 4:6 | CHB | 3 |
| Example 11 | 0.40 | 0.50 | 0.10 | 0.4 | 0.20 | 0.20 | 0.60 | 0.03 | 4:6 | CHB | 3 |
| Example 12 | 0.40 | 0.50 | 0.10 | 0.4 | 0.40 | 0.20 | 0.40 | 0.03 | 3:7 | CHB | 3 |
| Example 13 | 0.40 | 0.50 | 0.10 | 0.4 | 0.40 | 0.20 | 0.40 | 0.03 | 5:5 | CHB | 3 |
| Example 14 | 0.40 | 0.50 | 0.10 | 0.4 | 0.40 | 0.20 | 0.40 | 0.03 | 6:4 | CHB | 3 |
| Example 15 | 0.40 | 0.50 | 0.10 | 0.4 | 0.40 | 0.20 | 0.40 | 0.03 | 7:3 | CHB | 3 |
| Example 16 | 0.40 | 0.50 | 0.10 | 0.4 | 0.40 | 0.20 | 0.40 | 0.03 | 4:6 | BP | 3 |
| Example 17 | 0.40 | 0.50 | 0.10 | 0.4 | 0.40 | 0.20 | 0.40 | 0.03 | 4:6 | CHB + BP | 2% + 1% |
| Comparative Example 1 | 0.40 | 0.50 | 0.10 | 0.05 | 0.40 | 0.20 | 0.40 | 0.03 | 4:6 | CHB | 3 |
| Comparative Example 2 | 0.40 | 0.50 | 0.10 | 3.0 | 0.40 | 0.20 | 0.40 | 0.03 | 4:6 | CHB | 3 |
| Comparative Example 3 | 0.40 | 0.50 | 0.10 | 0.4 | 0.40 | 0.20 | 0.40 | 0.40 | 4:6 | CHB | 3 |
| Comparative Example 4 | 0.40 | 0.50 | 0.10 | 0.4 | 0.40 | 0.20 | 0.40 | 0.03 | 4:6 | — | — |
| Comparative Example 5 | 0.40 | 0.50 | 0.10 | 0.4 | 0.40 | 0.20 | 0.40 | 0.03 | 4:6 | CHB | 8 |

| | Battery performance | | | | |
|---|---|---|---|---|---|
| | | Overcharging | | | Preservation 60° C. for two months |
| | | 25° C. | 60° C. | | |
| | Battery resistance mΩ | Operation of CID P/N | Operation of CID P/N | Surface temperature ° C. | Operation of CID P/N |
| Example 1 | 2.4 | P | P | 102 | N |
| Example 2 | 2.4 | P | P | 103 | N |
| Example 3 | 2.5 | P | P | 100 | N |
| Example 4 | 2.4 | P | P | 102 | N |
| Example 5 | 2.4 | P | P | 102 | N |
| Example 6 | 2.2 | P | P | 95 | N |
| Example 7 | 2.6 | P | P | 113 | N |

TABLE 1-continued

|  | | | | | |
|---|---|---|---|---|---|
| Example 8 | 2.3 | P | P | 103 | N |
| Example 9 | 2.5 | P | P | 100 | N |
| Example 10 | 2.5 | P | P | 107 | N |
| Example 11 | 2.6 | P | P | 110 | N |
| Example 12 | 2.6 | P | P | 105 | N |
| Example 13 | 2.3 | P | P | 102 | N |
| Example 14 | 2.2 | P | P | 101 | N |
| Example 15 | 2.1 | P | P | 101 | N |
| Example 16 | 2.5 | P | P | 105 | N |
| Example 17 | 2.4 | P | P | 107 | N |
| Comparative Example 1 | 2.3 | P | N | 103 | N |
| Comparative Example 2 | 2.6 | P | P | 99 | P |
| Comparative Example 3 | 2.5 | N | P | 95 | N |
| Comparative Example 4 | 2.2 | N | N | 61 | N |
| Comparative Example 5 | 3.4 | P | P | 115 | N |

As shown in Table 1, in the examples satisfying all of the conditions of (1) to (5), the CID operated in both the overcharging test in an environment of 25° C. and the overcharging test in an environment of 60° C., the CID did not operate during the high-temperature preservation, and the battery resistance was low.

(1) The first positive electrode active material particles include 0.1% by mass or more and 1% by mass or less of lithium carbonate.

(2) The content of Mn (z1) in the first lithium transition metal oxide satisfies $0.05 \leq z1 \leq 0.20$.

(3) The second positive electrode active material particles include 0.01% by mass or more and 0.05% by mass or less of lithium carbonate.

(4) The content of Mn (z2) in the second lithium transition metal oxide satisfies $0.40 \leq z2 \leq 0.60$.

(5) The electrolytic solution includes 1% by mass or more and 5% by mass or less of the overcharging additive.

In Comparative Example 1, in the environment of 60° C., the CID did not operate. This is considered to be because the content of lithium carbonate in the first positive electrode active material particles was too small.

In Comparative Example 2, during the preservation at 60° C. (during ordinary use), the CID operated. This is considered to be because the content of lithium carbonate in the first positive electrode active material particles was too large.

In Comparative Example 3, in the environment of 25° C., the CID did not operate. After the overcharging test in the environment of 25° C., the gas in the battery was analyzed through gas chromatography (GC). As a result, in Comparative Example 3, it was clarified that the amount of $H_2$ gas generated was smaller than usual. This is considered to be because the content of lithium carbonate in the second positive electrode active material particles was too large and thus the $H_2$ gas generation reaction was hindered.

In Comparative Example 4, the CID did not operate irrespective of the temperature environments. This is considered to be because the electrolytic solution did not include any overcharging additives. The surface temperature of the battery is considered to have become low since heat of polymerization was not generated by the polymerization of overcharging additives, and resistance coatings were also not formed.

In Comparative Example 5, the battery resistance was relatively high. This is considered to be because the content of the overcharging additive in the electrolytic solution was too large.

The embodiment and the examples described above are supposed to be considered as examples in all aspects and not being restrictive. The scope of the disclosure is specified by the claims, not by the description above, and is intended to include all modifications in the equivalent meaning and scope of the claims.

What is claimed is:

1. A lithium ion secondary battery comprising:
a chassis;
a pressure-actuated safety device configured to operate depending on an internal pressure of the chassis;
a positive electrode accommodated in the chassis;
a negative electrode accommodated in the chassis; and
an electrolytic solution accommodated in the chassis, wherein:
the positive electrode includes first positive electrode active material particles and second positive electrode active material particles;
the first positive electrode active material particles include 0.1% by mass or more and 1% by mass or less of lithium carbonate and a first lithium transition metal oxide as a remainder;
the first lithium transition metal oxide is represented by the following first formula

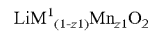

here, $M^1$ represents a metal element other than Mn, and z1 satisfies $0.05 \leq z1 \leq 0.20$;
the second positive electrode active material particles include 0.01% by mass or more and 0.05% by mass or less of lithium carbonate and a second lithium transition metal oxide as a remainder;
the second lithium transition metal oxide is represented by the following second formula

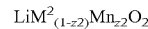

here, $M^2$ represents a metal element other than Mn, and z2 satisfies $0.40 \leq z2 \leq 0.60$;
the electrolytic solution includes 1% by mass or more and 5% by mass or less of an overcharging additive, and a solvent and a lithium salt as a remainder; and
the overcharging additive is a benzene derivative having a lower oxidation potential than the solvent.

2. The lithium ion secondary battery according to claim 1, wherein:

the first lithium transition metal oxide is represented by the following third formula $$LiNi_{x1}Co_{y1}Mn_{z1}O_2$$

here, x1, y1, and z1 satisfy $0.40 \leq x1 \leq 0.45$, $0.40 \leq y1 \leq 0.50$, $0.05 \leq z1 \leq 0.20$, and $x1+y1+z1=1$; and the second lithium transition metal oxide is also represented by the following fourth formula $$LiNi_{x2}Co_{y2}Mn_{z2}O_2$$

here, x2, y2, and z2 satisfy $0.20 \leq x2 \leq 0.40$, $0.20 \leq y2 \leq 0.25$, $0.40 \leq z2 \leq 0.60$, and $x2+y2+z2=1$.

3. The lithium ion secondary battery according to claim 1, wherein the benzene derivative is at least one of cyclohexylbenzene and biphenyl.

4. The lithium ion secondary battery according to claim 1, wherein the electrolytic solution includes 1% by mass or more and 3% by mass or less of the overcharging additive.

5. The lithium ion secondary battery according to claim 1, wherein the first positive electrode active material particles and the second positive electrode active material particles satisfy a relationship of 3:7 to 7:3 (the first positive electrode active material particles:the second positive electrode active material particles) in mass ratio.

* * * * *